(12) United States Patent
Yang et al.

(10) Patent No.: US 9,058,760 B2
(45) Date of Patent: Jun. 16, 2015

(54) ADJUSTING METHOD AND DISPLAY APPARATUS USING SAME

(71) Applicant: DELTA ELECTRONICS, INC., Taoyuan Hsien (TW)

(72) Inventors: Chung-Yi Yang, Taoyuan Hsien (TW); Bor Wang, Taoyuan Hsien (TW); Chen-Yu Wu, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 184 days.

(21) Appl. No.: 13/797,094

(22) Filed: Mar. 12, 2013

(65) Prior Publication Data

US 2014/0176594 A1 Jun. 26, 2014

(30) Foreign Application Priority Data

Dec. 24, 2012 (TW) .............................. 101149470 A

(51) Int. Cl.
| | | |
|---|---|---|
| G09G 5/00 | (2006.01) | |
| G09G 5/02 | (2006.01) | |
| H04N 5/46 | (2006.01) | |
| H04N 5/202 | (2006.01) | |
| G06K 9/00 | (2006.01) | |
| G06F 3/08 | (2006.01) | |
| H04N 1/60 | (2006.01) | |
| G09G 3/00 | (2006.01) | |

(52) U.S. Cl.
CPC ............... *G09G 5/02* (2013.01); *H04N 1/6058* (2013.01); *G09G 3/006* (2013.01); *G09G 2340/06* (2013.01)

(58) Field of Classification Search
USPC ......... 345/581, 589–590, 591, 593, 600, 604, 345/619, 690; 348/253–254, 552, 557, 560, 348/577, 630; 358/518, 519, 520, 523; 382/162, 167, 254, 274
See application file for complete search history.

(56) References Cited

U.S. PATENT DOCUMENTS

| | | | |
|---|---|---|---|
| 6,198,552 B1 * | 3/2001 | Nagae ........................... | 358/518 |
| 2003/0034986 A1 * | 2/2003 | Fukasawa ..................... | 345/591 |
| 2006/0119870 A1 * | 6/2006 | Ho et al. ........................ | 358/1.9 |
| 2007/0291287 A1 * | 12/2007 | Snyder et al. .................. | 358/1.9 |
| 2008/0112026 A1 * | 5/2008 | Kishimoto .................... | 358/518 |
| 2008/0166043 A1 * | 7/2008 | Bassi et al. .................... | 382/167 |
| 2010/0328343 A1 * | 12/2010 | Saito et al. .................... | 345/625 |
| 2013/0120774 A1 * | 5/2013 | Kouguchi ...................... | 358/1.9 |
| 2013/0141740 A1 * | 6/2013 | Shimbaru ...................... | 358/1.9 |
| 2014/0300617 A1 * | 10/2014 | Cameron ....................... | 345/589 |

FOREIGN PATENT DOCUMENTS

| | | |
|---|---|---|
| TW | 200849971 | 12/2008 |
| TW | 201038931 | 11/2010 |
| TW | 201129077 | 8/2011 |

\* cited by examiner

*Primary Examiner* — Wesner Sajous
(74) *Attorney, Agent, or Firm* — Kirton McConkie; Evan R. Witt

(57) ABSTRACT

An adjusting method includes steps of providing a display apparatus, transforming a first value in a first color space of a color displayed by the display apparatus into a second value in a second color space, adjusting the second value to a third value in the second color space, and transforming the third value into a fourth value in the first color space. By adjusting the second value to the third value in the second color space intuitively, the present invention achieves the advantages of providing an intuitive operation, simplifying the adjustment, saving time and enhancing the user experiences.

9 Claims, 8 Drawing Sheets

ADJUSTING METHOD AND DISPLAY APPARATUS USING SAME

FIELD OF THE INVENTION

The present invention relates to an adjusting method, and more particularly to an adjusting method and a display apparatus using the same.

BACKGROUND OF THE INVENTION

With growing of technologies, lot types of display apparatus are widely used in homes, schools and business occasions (e.g. displays, monitors and projectors) for displaying images or videos. In recent years, the technologies grow day by day, so the user demands of high-resolution and high-pixel also increase, among which the High Definition Television (hereinafter HDTV) is the most popular product in the modern society for industry and user.

Generally, a display apparatus has a native color gamut according to the characteristics of the panel and the display module after being fabricated. The display apparatus has to be adjusted in order to match the standard of color gamut of HDTV and have the same color performance with other display apparatuses, which means that the display color gamut of the display apparatus has to be adjusted from the native color gamut to the standard color gamut of HDTV (i.e. ITU-R Recommendation BT. 709 or Rec. 709). Please refer to FIG. 1. FIG. 1 schematically illustrates the color gamut of a conventional display apparatus of prior art. The region surrounded by the points 101, 102 and 103 is CIE 1931 standard color gamut defined by the Commission internationale de l'éclairage (CIE). Since the points 101, 102 and 103 are drawn in CIE x, y color space, the region surrounded by the points 101, 102 and 103 is CIE 1931 standard color gamut in CIE x, y color space, among which the point 101 is corresponding to a monochromatic light with 700 nm wavelength (i.e. red light), the point 102 is corresponding to a monochromatic light with 520 nm wavelength (i.e. green light), and the point 103 is corresponding to a monochromatic light with 380 nm wavelength (i.e. blue light).

As described above, after being fabricated, the display apparatus has a native color gamut, which is drawn as a triangular region surrounded by the points 201, 202 and 203. The points 201, 202 and 203 are corresponding to the coordinates of the red light, the green light and the blue light of the display apparatus, respectively. In other words, all the color coordinates of the colors displayed by the display apparatus are located in the native color gamut, so that it exists difference of color performance between different display apparatuses because of the native color gamuts of themselves. Therefore, the color gamut of the display apparatus has to be adjusted or corrected in order to match the standard color gamut of HDTV or Rec. 709. For example, the color gamut of the display apparatus is adjusted to the triangular region surrounded by the points 301, 302 and 303. When the color coordinates of the points 301, 302 and 303 in CIE x, y color space are respectively adjusted to (0.64, 0.33), (0.30, 0.60) and (0.15, 0.06), the points 301, 302 and 303 are represent the red light, the green light and the blue light, and the display color gamut of the display apparatus is matched with the standard color gamut of HDTV or Rec. 709. As a result, the different display apparatuses may be color-adjusted or color-corrected so as to have the same color performance corresponding to HDTV.

Moreover, besides the three primary colors (i.e. red, green and blue), the three secondary colors (i.e. yellow, cyan and purple) and the white color are also displayed by the display apparatus by way of combining the three primary colors. For example, the yellow color is displayed or generated by combining the red light and the green light, the cyan color is displayed or generated by combining the green light and the blue light, the purple color is displayed or generated by combining the blue light and the red light, and the white color is displayed or generated by combining the red light, the green light and the blue light. The coordinates of the yellow color, the cyan color and the purple color (i.e. the three secondary colors) are respectively drawn as the points 304, 305 and 306, and the coordinate of the white color is drawn as the point 307.

Please refer to FIGS. 1 and 2. FIG. 2 schematically illustrates the adjusted color gamut of a conventional display apparatus of prior art. The coordinates corresponding to the three secondary colors and the white color are adjusted in CIE x, y color space in order to adjust, enhance or improve the color performances of the three secondary colors and the white color, so that the color performance of the display apparatus is adjusted to become warmer or colder. For example, the point 304, which is corresponding to the yellow color displayed by the display apparatus, can be adjusted toward the point 302 (i.e. the green color) and finally shifted to the point 304'. Similarly, the point 305 corresponding to the cyan color and the point 306 corresponding to the purple color can be adjusted toward the point 303 (i.e. the blue color) and finally shifted to the point 305' and the point 306'. The point 307 corresponding to the white color is adjusted and shifted to the point 307' because of the above adjustment. Consequently, the color performance can be adjusted in the standard color gamut of HDTV in order to match the user demands and situations.

The native color gamut of the display apparatus can be adjusted to the required color gamut and the details of the color performance can be corrected by the above-mentioned adjustment. However, the adjusting method mentioned above is implemented by way of adjusting the color coordinates in CIE x, y color space with a colorimeter. It is well known that the color coordinates of the three primary colors in the native color gamut of the display apparatus are captured and measured by the colorimeter. Because the color coordinates are absolute coordinate value in CIE x, y color space, the color coordinates are not intuitive for users to recognize and memorize and the colors corresponding to the coordinates and the changes during the adjustment are not simple to imagine. Therefore, the appropriate amount of change of the color coordinate is always found by way of trial and error when adjusting the conventional display apparatus. It is difficult for users to adjust or correct the color performance of the display apparatus without the colorimeter.

There is a need of providing an adjusting method and a display apparatus using the same to obviate the drawbacks encountered from the prior art.

SUMMARY OF THE INVENTION

The present invention provides an adjusting method and a display apparatus using the same in order to eliminate the drawbacks caused by the unintuitive adjusting method, which has to be implemented with a colorimeter and by way of trial and error (e.g. high operation difficulty, bad user experience and high time cost).

The present invention also provides an adjusting method and a display apparatus using the same. An unintuitive first value in a first color space is transformed into an intuitive second value in a second color space. As a result, a display apparatus is color-adjusted or color-corrected without using any colorimeter.

The present invention further provides an adjusting method and a display apparatus using the same. By adjusting a second value to a third value in a second color space intuitively, the present invention achieves the advantages of providing an intuitive operation, simplifying the adjustment, saving time and enhancing the user experiences.

In accordance with an aspect of the present invention, there is provided an adjusting method. The adjusting method includes steps of providing a display apparatus, transforming a first value in a first color space of a color displayed by the display apparatus into a second value in a second color space, adjusting the second value to a third value in the second color space, and transforming the third value into a fourth value in the first color space.

In accordance with another aspect of the present invention, there is provided a display apparatus. The display apparatus includes a display module and a control module. The display module is for displaying at least a color. The control module is connected with the display module for performing an adjusting method. The adjusting method includes steps of transforming a first value in a first color space into a second value in a second color space, adjusting the second value to a third value in the second color space, and transforming the third value into a fourth value in the first color space.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
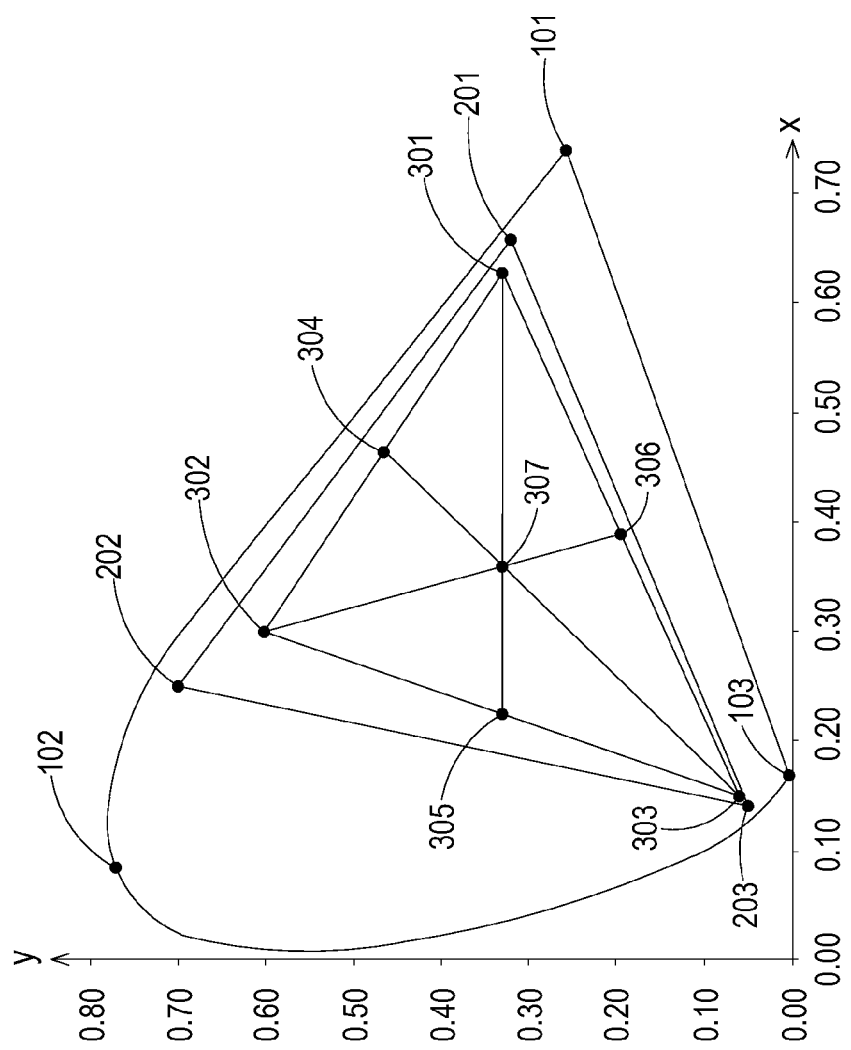
FIG. 1 schematically illustrates the color gamut of a conventional display apparatus of prior art.
Figure 2:
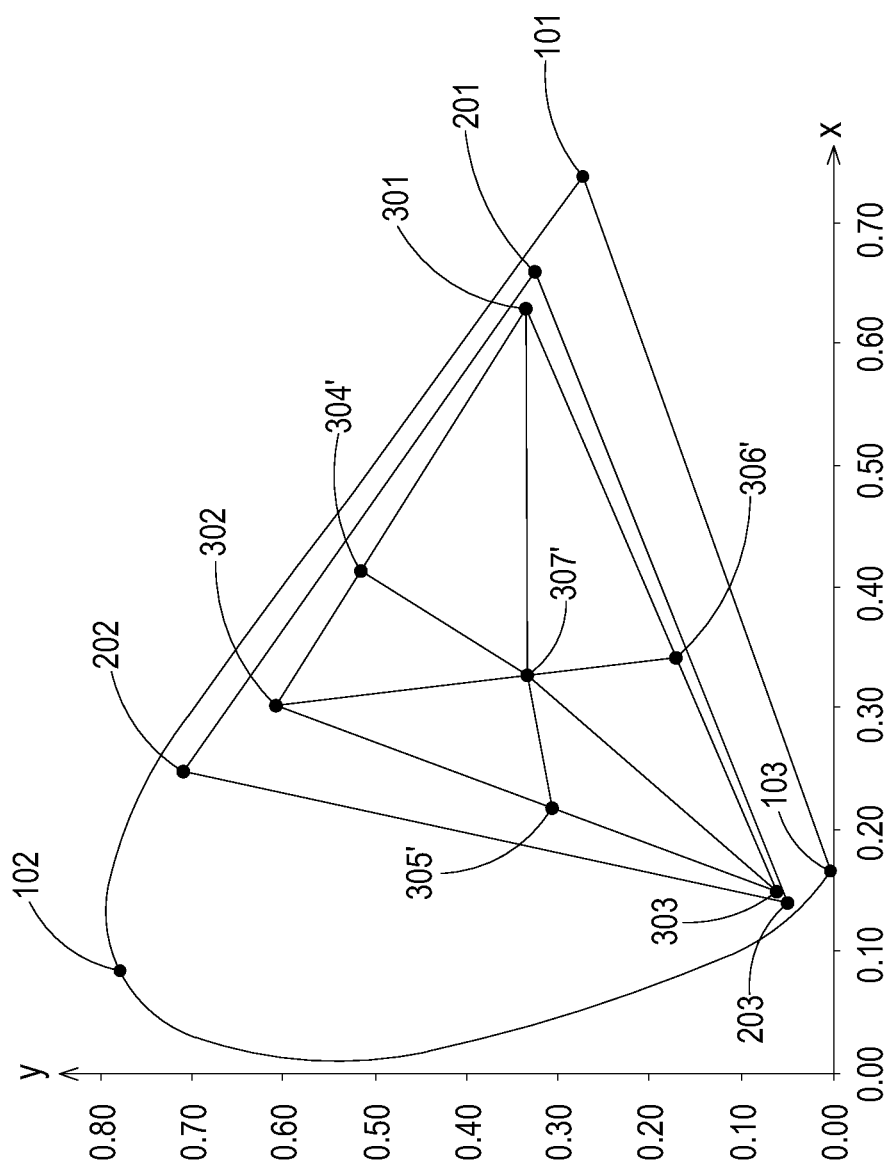
FIG. 2 schematically illustrates the adjusted color gamut of a conventional display apparatus of prior art.
Figure 3:
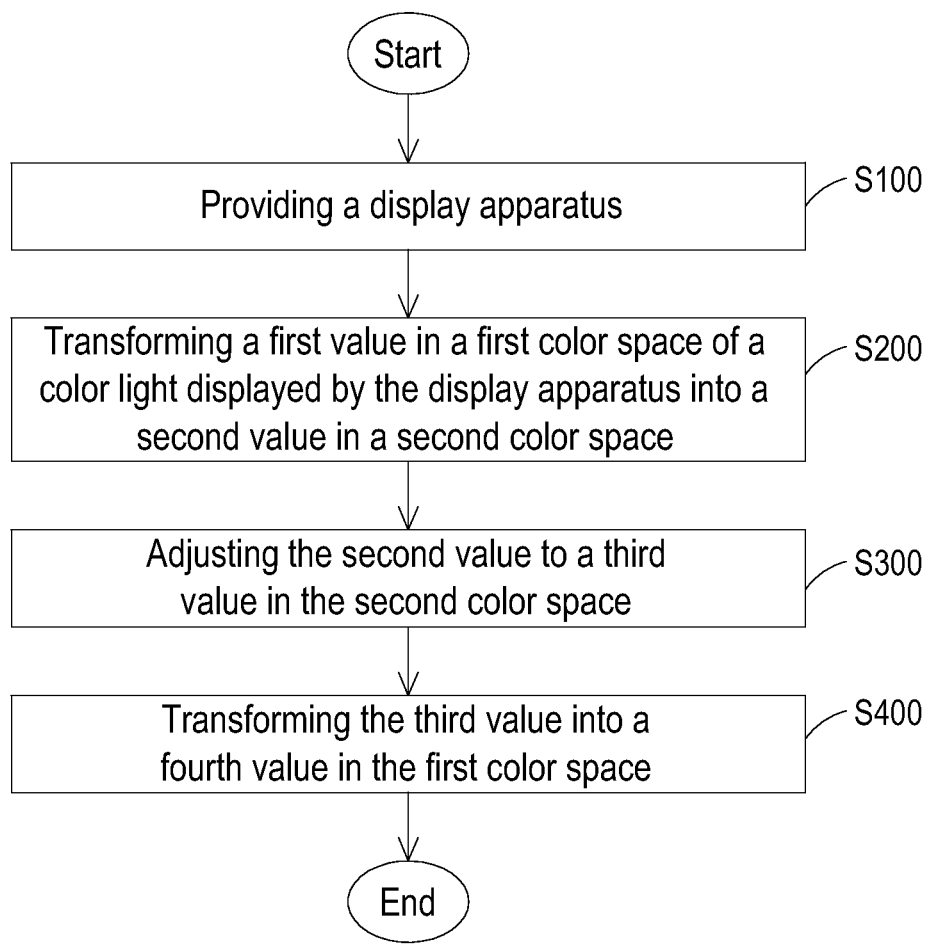
FIG. 3 schematically illustrates a flow chart of an adjusting method according to an embodiment of the present invention.
Figure 4:
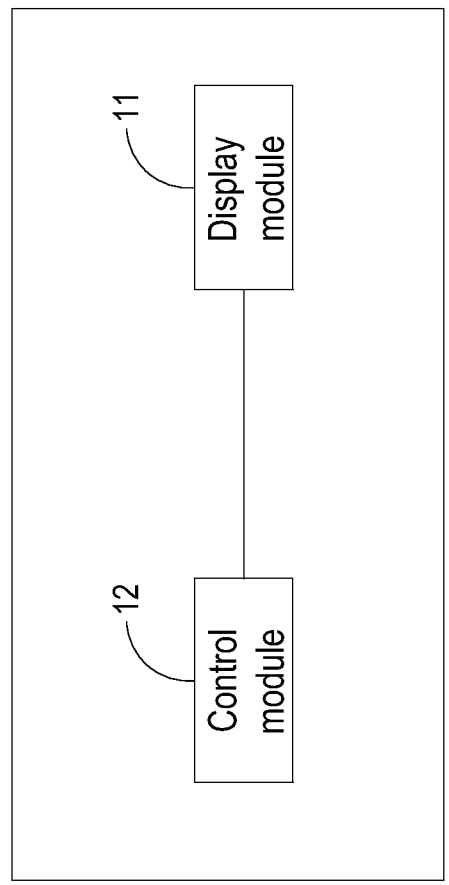
FIG. 4 schematically illustrates the configuration of a display apparatus according to an embodiment of the present invention.

Please refer to FIGS. 3 and 4. FIG. 3 schematically illustrates a flow chart of an adjusting method according to an embodiment of the present invention. FIG. 4 schematically illustrates the configuration of a display apparatus according to an embodiment of the present invention. The adjusting method according to an embodiment of the present invention is used for adjusting the hue and the color saturation under the mapping of color space conversion. The adjusting method includes steps as follows. First of all, as shown in step S100, providing a display apparatus 10, among which the display apparatus includes a display module 11 and a control module 12. An example of the display apparatus 10 is not limited to a liquid crystal display (LCD), a planar display, a plasma display or a projector. In this embodiment, at least a color is displayed by the display apparatus 10. For example, the color is red, blue, green, yellow, cyan, purple or white, but not limited thereto. The control module 12 is connected with the display module 11 for performing the adjusting method of the present invention. Next, transforming a first value in a first color space of a color displayed by the display apparatus into a second value in a second color space as shown in step S200. The first color space is CIE x, y color space (or called CIE xyY color space), CIE XYZ color space, RGB color space, YUV color space or CMYK color space, but not limited thereto. The first color space is also the primary and main color space of the display apparatus 10 for displaying colors. The second color space is among one of but not limited to HSV color space, HSL color space and YCbCr color space. The first value and the second value are corresponding to the values of hue and color saturation in the first color space and the second color space, respectively, such like a coordinate value, a number or a degree of angle. Then, as shown in step S300, adjusting the second value to a third value in the second color space. Since the second color space is an intuitive color space like HSV color space, HSL color space, YCbCr color space or the like, the user may easily adjust the second value to the third value in the second color space without using any measuring meter, so that the hue and the color saturation of the display apparatus 10 are adjusted directly.

After that, transforming the third value in the second color space into a fourth value in the first color space as shown in step S400 by way of mathematical transform. In other words, the third value in the second color space is reversely converted back to the fourth value, which is in the first color space, so as to be loaded by the display apparatus. The third value and the fourth value are corresponding to the values of hue and color saturation in the second color space and the first color space, respectively, such like a coordinate value, a number or a degree of angle, but not limited thereto. In brief, the fourth value, which is transformed, converted, and/or adjusted from the first value, the second value and the third value, is equivalently regarded as a value adjusted just in the first color space directly. Since the first value in the first color space is transformed into the second value and adjusted to the third in the second space, which is an intuitive color space, the drawbacks of prior art are eliminated. By adjusting the second value to the third value in the second color space intuitively, the present invention achieves the advantages of providing an intuitive operation, simplifying the adjustment, saving time and enhancing the user experiences.

For example, in HSL or HSV color space, which is a cylindrical color space, the hues of the red color, the green color and the blue color are defined as 0 degree (360 degrees), 120 degrees and 240 degrees, respectively, and the color saturations are defined as the distances between the points corresponding to the above mentioned colors and the central axis, which are from 0 to 1. The color concentration is the most saturated when the color saturation is 1. The hues are simply adjusted by 60 degrees when a user wants to adjust the three primary colors (e.g. red, green and blue) to the three secondary colors (e.g. yellow, cyan and purple) or adjust the three secondary colors to the three primary colors. Similarly, the hues are adjusted by 120 degrees when the user wants to adjust the three primary colors to the next three primary colors or adjust the three secondary colors to the next three secondary colors. For example, the red color, the green color and the blue color are adjusted to the green color, the blue color and the red color when the hues are adjusted by 120 degrees, but not limited thereto. On the other hand, the color saturation is simply adjusted between 0 and 1 when the user wants to adjust the color saturation.

In short, adjusting hue and color saturation in HSL color space or HSV color space is simple and intuitive, so the second color space of the present invention is ideally a HSL color space or a HSV color space. Moreover, since adjusting hue and color saturation in YCbCr color space is also relatively simple and intuitive, besides HSL and HSV color spaces, YCbCr is yet another preferable second color space.

Figure 5:
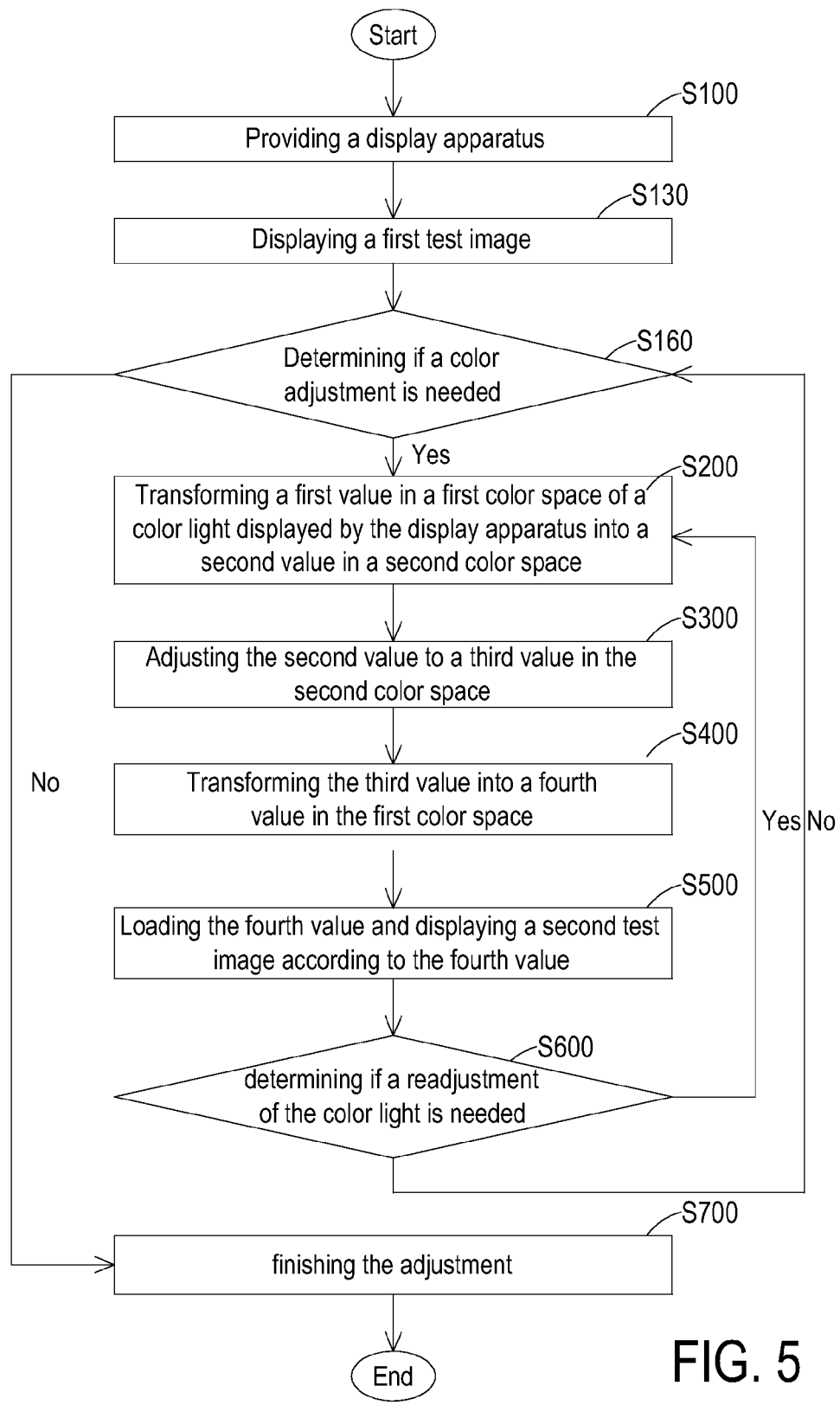
FIG. 5 schematically illustrates a flow chart of another adjusting method according to an embodiment of the present invention.

In some embodiments, the adjusting method according to the present invention may further be combined with the on-screen display (OSD) to provide for the user to adjust and operate. Please refer to FIGS. 4 and 5. FIG. 5 schematically illustrates a flow chart of another adjusting method according to an embodiment of the present invention. The adjusting method includes steps as follows. At first, providing a display apparatus 10 as shown in step S100. Next, displaying a first test image as shown in step S130, among which the first test image is displayed on a display module 11 of the display apparatus 10. Preferably, the test image is a rich colors image, such as a color-bar pattern. Then, determined if a color adjustment is needed as shown in step S160. In this embodiment, a user may determine if the color adjustment is needed according to the color performance of the first test image and choose yes or no. When the color adjustment is needed in step S160, a step S200 of transforming a first value in a first color space of a color displayed by the display module 11 of the display apparatus 10 into a second value in a second color space is performed after step S160. Next, adjusting the second value to a third value in the second color space as shown in step S300. Then, transforming the third value into a fourth value in the first color space as shown in step S400. Next, loading the fourth value and displaying a second test image according to the fourth value as shown in step S500, and then determining if a readjustment of the color is needed as shown in step S600. When the readjustment of the color is needed in step S600, steps S200 to S600 are performed again after step S600. Otherwise, when the readjustment of the color is not needed in step S600, step S160 is performed after step S600 in order to determine if the color adjustment is needed. Finally, when the color adjustment is not needed in step S160, a step S700 of finishing the adjustment is performed after step S160.

Figure 6:
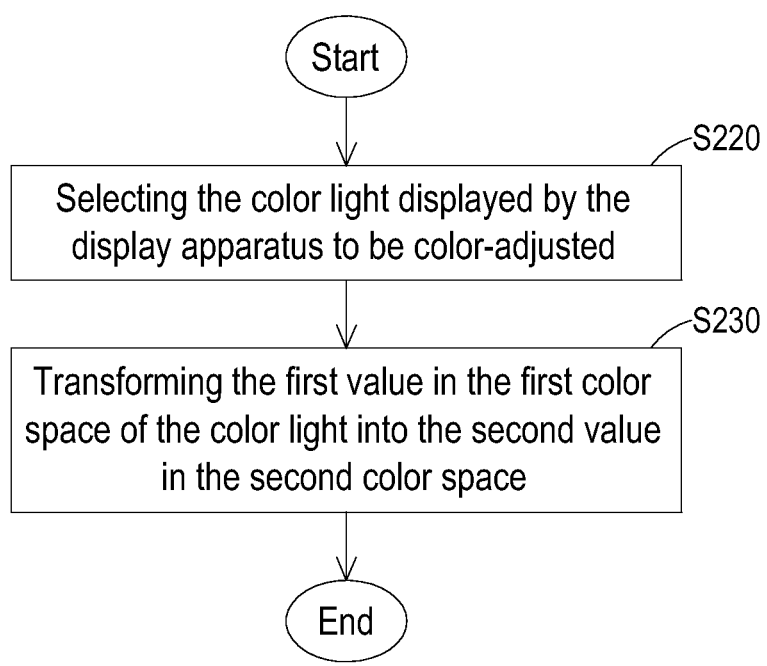
FIG. 6 schematically illustrates the detailed flow chart of the adjusting method according to an embodiment of the present invention.

Please refer to FIGS. 3, 4, 5 and 6. FIG. 6 schematically illustrates the detailed flow chart of the adjusting method according to an embodiment of the present invention. As shown in FIGS. 3, 4, 5 and 6, step S200 of the adjusting method of the present invention further includes steps as follows. First of all, selecting the color displayed by the display apparatus 10 to be color-adjusted as shown in step S200, among which the color is selected and chose by the user from the three primary colors, the three secondary colors and the white color. Next, as shown in step S230, transforming the first value in the first color space of the color into the second value in the second color space. The following steps after steps S220 and S230 of step S200 are similar to the above-mentioned embodiments, and not redundantly described herein. As a result, one of the three primary colors, the three secondary colors and the white color may be selected or chose by the user to be color-adjusted. In other words, the red color, the blue color, the green color, the yellow color, the cyan color, the purple color and the white color are adjusted and corrected, respectively, so that the hues and the color saturation of the display apparatus 10 are adjusted to the required condition by way of using the adjusting method of the present invention.

Figure 7:
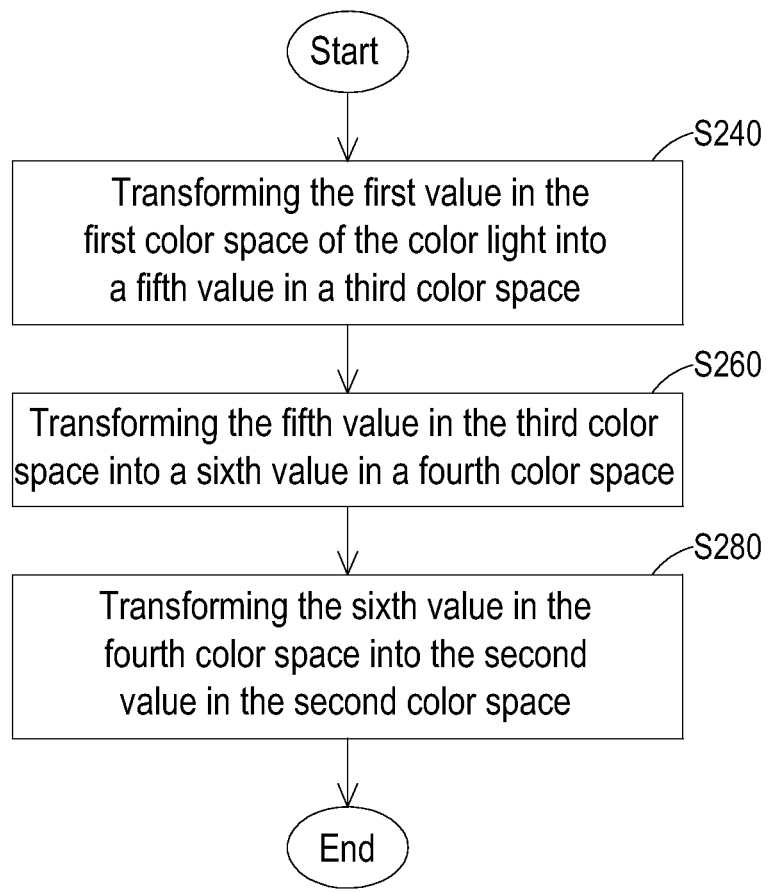
FIG. 7 schematically illustrates the detailed flow chart of the adjusting method according to another embodiment of the present invention.

Please refer to FIGS. 3, 4, 5 and 7. FIG. 7 schematically illustrates the detailed flow chart of the adjusting method according to another embodiment of the present invention. As shown in FIGS. 3, 4, 5 and 7, step S200 of the adjusting method according to another embodiment of the present invention further includes steps as follows. At first, transforming the first value in the first color space of the color into a fifth value in a third color space as shown in step S240. Next, transforming the fifth value in the third color space into a sixth value in a fourth color space as shown in step S260. Then, transforming the sixth value in the fourth color space into the second value in the second color space as shown in step S280. In this embodiment, the third color space is CIE XYZ color space and the fourth color space is RGB color space, but not limited thereto. For example, the first value in the first color space of the color displayed by the display apparatus 10, which is the coordinate (x, y, Y) in CIE x, y color space, is transformed into the fifth value in the third color space, which is the coordinate (X, Y, Z) in CIE XYZ color space. The transforming equations are given by:

$$X = \frac{Y}{y} \cdot x$$

$$Y = Y$$

$$Z = \frac{Y}{y} \cdot (1 - x - y)$$

Next, as shown in step S260, the fifth value in the third color space, which is the coordinate (X, Y, Z) in CIE XYZ color space, is transformed into the sixth value in the fourth color space, which is the coordinate (R, G, B) in RGB color space. The transforming equations are given by:

$$\begin{bmatrix} R \\ G \\ B \end{bmatrix} = \begin{bmatrix} c_{11} & c_{12} & c_{13} \\ c_{21} & c_{22} & c_{23} \\ c_{31} & c_{32} & c_{33} \end{bmatrix} \cdot \begin{bmatrix} X \\ Y \\ Z \end{bmatrix}$$

Then, as shown in step S280, the sixth value in the fourth color space, which is the coordinate (R, G, B) in RGB color space, is transformed into the second value in the second color space (i.e. HSV color space). The transforming equations are given by:

$$M = \max(R, G, B)$$

$$m = \min(R, G, B)$$

$$C = M - m$$

$$V = M$$

$$H' = \begin{cases} \text{undefined}, & \text{if } C = 0 \\ \dfrac{G-B}{C} \bmod 6, & \text{if } M = R \\ \dfrac{B-R}{C} + 2, & \text{if } M = G \\ \dfrac{R-G}{C} + 4, & \text{if } M = B \end{cases}$$

$$H = 60° \times H'$$

Consequently, the first value in the first color space is finally transformed into the second value in the second color space, and step S300 of adjusting the second value to the third value in the second color space is performed after those steps S240 to S280.

Figure 8:
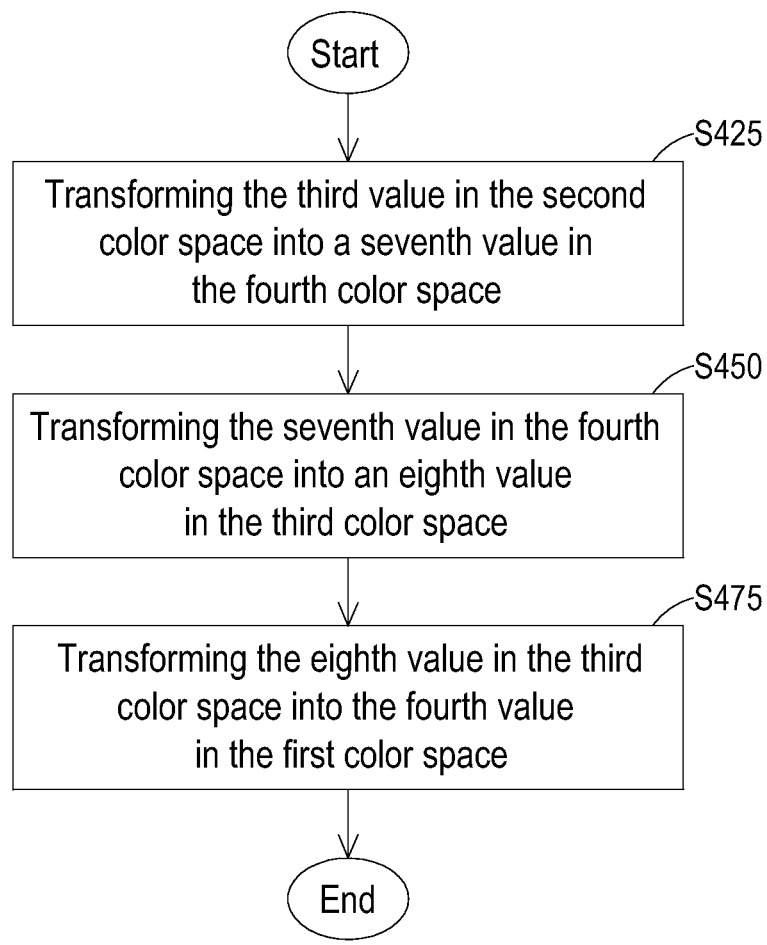
FIG. 8 schematically illustrates the detailed flow chart of the adjusting method according to still another embodiment of the present invention.

Please refer to FIGS. 3, 4, 5 and 8. FIG. 8 schematically illustrates the detailed flow chart of the adjusting method according to still another embodiment of the present invention. Step S400 of the adjusting method according to still another embodiment of the present invention further includes steps as follows. First of all, transforming the third value in the second color space into a seventh value in the fourth color space as shown in step S425. Next, transforming the seventh value in the fourth color space into an eighth value in the third color space as shown in step S450. Then, transforming the eighth value in the third color space into the fourth value in the first color space as shown in step S475. After the second value is adjusted to the third value by the user in the second color space, which is HSV color space, the third value in the second color space is transformed into the seventh value in the fourth color space as shown in step S425. In brief, the third value in HSV color space is reversely transformed into the seventh value (i.e. (R, G, B)) in RGB color space. The transforming equations are given by:

$$C = V \times S_{HSV}$$

$$H' = \frac{H}{60°}$$

$$X = C(1 - |H' \bmod 2 - 1|)$$

$$(R_1, G_1, B_1) = \begin{cases} (0,0,0) & \text{if } H \text{ is undefined} \\ (C, X, 0) & \text{if } 0 \le H' < 1 \\ (X, C, 0) & \text{if } 1 \le H' < 2 \\ (0, C, X) & \text{if } 2 \le H' < 3 \\ (0, X, C) & \text{if } 3 \le H' < 4 \\ (X, 0, C) & \text{if } 4 \le H' < 5 \\ (C, 0, X) & \text{if } 5 \le H' < 6 \end{cases}$$

$$m = V - C$$

$$(R, G, B) = (R_1 + m, G_1 + m, B_1 + m)$$

Next, as shown in step S450, the seventh value in the fourth color space, which is the coordinate (R, G, B) in RGB color space, is transformed into the eighth value in the third color space, which is the coordinate (X, Y, Z) in CIE XYZ color space. The transforming equations are given by:

$$\begin{bmatrix} X \\ Y \\ Z \end{bmatrix} = \begin{bmatrix} b_{11} & b_{12} & b_{13} \\ b_{21} & b_{22} & b_{23} \\ b_{31} & b_{32} & b_{33} \end{bmatrix} \cdot \begin{bmatrix} R \\ G \\ B \end{bmatrix}$$

Then, as shown in step S475, the eighth value in the third color space, which is the coordinate (X, Y, Z) in CIE XYZ color space, is transformed into the fourth value in the first color space, which is the coordinate (x, y, Y) in CIE x, y color space. The transforming equations are given by:

$$x' = \frac{X}{X+Y+Z}$$

$$y' = \frac{Y}{X+Y+Z}$$

Under this circumstance, the third value in the second color space is transformed into the fourth value in the first color space, so that the equivalent adjustment of the hues and the color saturation in the first color space is implemented. Certainly, in some embodiments, the second color space can also be a HSL color space or a YCbCr color space, and the transforming equations are similarly mathematical equations and are not redundantly described herein.

From the above description, the present invention provides an adjusting method and a display apparatus using the same. An unintuitive first value in a first color space is transformed into an intuitive second value in a second color space. As a result, a display apparatus is color-adjusted or color-corrected without using any colorimeter. On the other hand, by adjusting a second value to a third value in a second color space intuitively, the present invention achieves the advantages of providing an intuitive operation, simplifying the adjustment, saving time and enhancing the user experiences.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. adjusting method, comprising steps of:
   (a) providing a display apparatus;
   (b) transforming a first value in a first color space of a color displayed by said display apparatus into a second value in a second color space;
   (c) adjusting said second value to a third value in said second color space; and
   (d) transforming said third value into a fourth value in said first color space,
   wherein said step (b) further includes steps of:
   (b1) transforming said first value in said first color space of said color into a fifth value in a third color space;
   (b2) transforming said fifth value in said third color space into a sixth value in a fourth color space; and
   (b3) transforming said sixth value in said fourth color space into said second value in said second color space.

2. The adjusting method according to claim 1 wherein said step (b) further includes steps of:

selecting said color displayed by said display apparatus to be color-adjusted; and transforming said first value in said first color space of said color into said second value in said second color space.

3. The adjusting method according to claim 1 wherein said step (d) further includes steps of:
  (d1) transforming said third value in said second color space into a seventh value in said fourth color space;
  (d2) transforming said seventh value in said fourth color space into an eighth value in said third color space; and
  (d3) transforming said eighth value in said third color space into said fourth value in said first color space.

4. The adjusting method according to claim 1 further includes steps between said step (a) and said step (b) of:
  (a1) displaying a first test image; and
  (a2) determining if a color adjustment is needed.

5. The adjusting method according to claim 4 further includes steps after said step (d) of:
  (e) loading said fourth value and displaying a second test image according to said fourth value; and
  (f) determining if a readjustment of said color is needed.

6. The adjusting method according to claim 5 wherein when said color adjustment is needed, said step (b) is performed after said step (a2), and when said color adjustment is not needed, a step (g) of finishing the adjustment is performed after said step (a2).

7. The adjusting method according to claim 5 wherein when said readjustment of said color is needed, said step (b) is re-performed after said step (f), and when said readjustment of said color is not needed, said step (a2) is performed after said step (f).

8. An adjusting method, comprising steps of:
  (a) providing a display apparatus;
  (b) displaying a first test image;
  (c) determining if a color adjustment is needed;
  (d) transforming a first value in a first color space of a color displayed by said display apparatus into a second value in a second color space;
  (e) adjusting said second value to a third value in said second color space;
  (f) transforming said third value into a fourth value in said first color space;
  (g) loading said fourth value and displaying a second test image according to said fourth value;
  (h) determining if a readjustment of said color is needed; and
  (i) finishing the adjustment,
  wherein when said color adjustment is needed, said steps (d) to (h) are performed after said step (c), and when said color adjustment is not needed, said step (i) is performed after said step (c),
  wherein when said readjustment of said color is needed, said steps (d) to (h) are re-performed after said step (h), and when said readjustment of said color is not needed, said step (c) is performed after said step (h).

9. A display apparatus, comprising:
  a display module for displaying at least a color; and
  a control module connected with said display module for performing an adjusting method, wherein said adjusting method comprising steps of:
  transforming a first value in a first color space of said color into a fifth value in a third color space;
  transforming said fifth value in said third color space into a sixth value in a fourth color space;
  transforming said sixth value in said fourth color space into a second value in a second color space;
  adjusting said second value to a third value in said second color space; and
  transforming said third value into a fourth value in said first color space.

* * * * *